UNITED STATES PATENT OFFICE.

EMANUEL KLEIN, OF NEW YORK, N. Y.

PROCESS OF AND PRODUCT FROM TREATING MARROW.

No. 862,337.                Specification of Letters Patent.            Patented Aug. 6, 1907.

Application filed November 9, 1905. Serial No. 286,493.

*To all whom it may concern:*

Be it known that I, EMANUEL KLEIN, a citizen of the United States, and a resident of the borough of Manhattan, city, county, and State of New York, have invented certain new and useful Improvements in Processes of and Products from Treating Marrow, of which the following is a specification.

This invention relates to a new manufacture from the fatty matter of marrow.

It is known that marrow contains about 95 per cent. of fat, which when analyzed, is shown to contain a mixture of palmitic and stearic acid, both acids occurring as glycerids. From this fatty matter of marrow I produce a new product which is the purified substance separated from the marrow, from all parts of the animal organism which may be employed for medical, pharmaceutical, chemical and industrial uses.

In the manufacture of the substance I proceed as follows: First, the fresh raw marrow is disintegrated after which the mass is thoroughly kneaded and washed in cold water so as to remove the coagulated blood, dirt and other impurities. Following this preliminary cleansing operation, after the water has been removed, the mass is subjected to heat at a temperature of not over 150 degrees centigrade, which effects a separation of the fatty substances from the cellular tissue, lymphatics, graves and the like, which at this stage in the process either precipitates or rises above the mass and which is then removable, after which the product is allowed to cool when it will thicken. This product is then stirred and subjected to heat by the use of superheated steam, preferably directly introduced into the mass, or heated by other means, while being stirred, until a temperature of about 250 degrees centigrade is obtained for a time not exceeding two hours which purifies the glycerid and drives out acrolin which forms as such during the decomposition created by the heating process. At the same time this process is being carried out, some well known means is employed for cooling the mass to prevent its too rapid heating thereby preventing burning or scorching which, if permitted, would result in the discoloration and by this mode the mass is enabled to be subjected to the heating process for a much longer time without the liability of burning it. When the mass has been heated at a temperature of 250 degrees centigrade for two hours, and the steam as well as the cooling application is shut off, while in said heated condition it is further purified by treatment with some suitable menstruum such as alcohol, etc., and the mass is stirred until all of it has been thoroughly subjected to the influence of said menstruum. This treatment will eliminate the objectionable color or odor of the product by dissolving or oxidizing the matter to which the color or odor is due and rising on top of the mass may be removed leaving the underlying product colorless and odorless. After this treatment with a liquid menstruum has taken place the stirring is discontinued and as the mass cools, it separates into two layers, the upper being the menstruum which may then be withdrawn. The mass is again heated to 250 degrees centigrade after which it is filtered through some organic or inorganic filtering material, such as marble-dust, burned deer's bones etc., used in connection with asbestos filtering. The menstruum may, if stable, be purified for utilization again. If alcohol is employed the quantity found to be practicable is 2 parts of alcohol to 1 part of marrow. The resultant is an odorless substance consisting of a mixture of fatty acids and higher alcohols of the fatty series. This is of a butter like consistency, light yellow in color, is insoluble in water or alcohol, will not become rancid and may be utilized for medical, pharmaceutical, chemical or industrial purposes.

My invention is not limited to the precise steps above set forth for manufacturing a product from marrow, and the process may be modified without departing from the spirit of my invention.

The product has a specific gravity at 15° centigrade of 0.931 to 0.938, a melting point of 37 to 45 degrees and a solidifying point of 29 to 31 degrees.

What I claim is:

1. A process of treating marrow which consists in subjecting marrow to disintegration, washing the same, heating the same at about 150 degrees centigrade, filtering the resulting product, subjecting it to the action of a menstruum and removing the menstruum from the product.

2. The process of treating marrow which consists in subjecting crude marrow to disintegration, washing the same, heating the same to about 150 degrees centigrade, removing the cellular substances, heating it to about 250 degrees centigrade, subjecting it to the action of a menstruum and removing the menstruum from the product.

3. The process of manufacture from the fatty matter of marrow, which consists in subjecting the raw marrow to heat at one temperature to free it from cellular tissue and the like, then cooling the product, and then heating the same at a higher temperature and stirring the same while being heated to remove acrolein, then stopping the heating operation and purifying the product while still hot with a menstruum, stirring the product, then heating and then removing the menstruum from the product then filtering the remainder.

4. A product from treating marrow, constituting a homogeneous, odorless, non-rancifiable mass of light-yellow color, being insoluble in water or alcohol, having a specific gravity at 15 degrees centigrade of 0.931 to 0.938, a melting point of 37 to 45 degrees and a solidifying point of 29 to 31 degrees.

5. A product from treating marrow, constituting a homogeneous odorless, non-rancifiable mass of butter-like consistency and light yellow color, comprising substantially a mixture of fatty acids and higher alcohols of the fatty series, the product being insoluble in water or alcohol having a specific gravity at 15 degrees centigrade of 0.931 to 0.938, a melting point of 37 to 45 degrees and a solidifying point of 29 to 31 degrees.

In testimony whereof I have signed this specification in the presence of two subscribing witnesses.

EMANUEL KLEIN.

Witnesses:
OLIN A. FOSTER,
A. L. O'BRIEN.